US007333659B2

(12) United States Patent
Togashi

(10) Patent No.: US 7,333,659 B2
(45) Date of Patent: Feb. 19, 2008

(54) PICTURE ENCODER AND PICTURE ENCODING METHOD

(75) Inventor: Haruo Togashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 529 days.

(21) Appl. No.: 10/822,488

(22) Filed: Apr. 12, 2004

(65) Prior Publication Data
US 2004/0252893 A1    Dec. 16, 2004

(30) Foreign Application Priority Data
Apr. 14, 2003 (JP) ............................. 2003-109053

(51) Int. Cl.
*G06K 9/36* (2006.01)
*G06K 9/46* (2006.01)
*G06F 15/00* (2006.01)
*G06F 15/76* (2006.01)

(52) U.S. Cl. .................... 382/232; 382/162; 382/250; 382/251; 712/36

(58) Field of Classification Search ................ 382/234, 382/244, 166, 239, 232, 250–251; 712/2, 712/35, 221; 345/505, 506; 710/29, 30, 710/33, 34, 52, 60, 61
See application file for complete search history.

(56) References Cited

U.S. PATENT DOCUMENTS 5,790,131 A * 8/1998 Liang et al. ................ 345/660
5,818,877 A * 10/1998 Tsai et al. ................... 375/241
6,141,446 A * 10/2000 Boliek et al. ............... 382/233
6,263,110 B1 * 7/2001 Andrew et al. ............. 382/232
6,812,865 B2 * 11/2004 Saunders ...................... 341/51
2002/0003905 A1 * 1/2002 Sato et al. .................. 382/240
2002/0154823 A1 * 10/2002 Okada ........................ 382/233
2003/0002742 A1 * 1/2003 Sano et al. ................. 382/239

FOREIGN PATENT DOCUMENTS

| JP | 2002-034043 | 1/2002 |
| JP | 2002-290242 | 10/2002 |
| JP | 2003-008906 | 1/2003 |
| JP | 2003-304405 | 10/2003 |
| JP | 2003-324612 | 11/2003 |
| JP | 2004-064115 | 2/2004 |
| JP | 2004-304238 | 10/2004 |

* cited by examiner

Primary Examiner—Kim Huynh
Assistant Examiner—Jonathan R. Plante
(74) Attorney, Agent, or Firm—Finnegan, Henderson, Farabow, Garrett & Dunner, L.L.P.

(57) ABSTRACT

An encoder and an encoding method capable of improving the transfer efficiency in an encoding process is provided. The encoder determines the number of removed bit planes in order that the quantity of generated codes per frame is kept constant when performing the encoding process. A predetermined number of bit planes corresponding to those parts of information that seem relatively small to users are removed. Accordingly, the encoder can prevent variation of processing time in a stage before the encoder performs an encoding process.

9 Claims, 13 Drawing Sheets

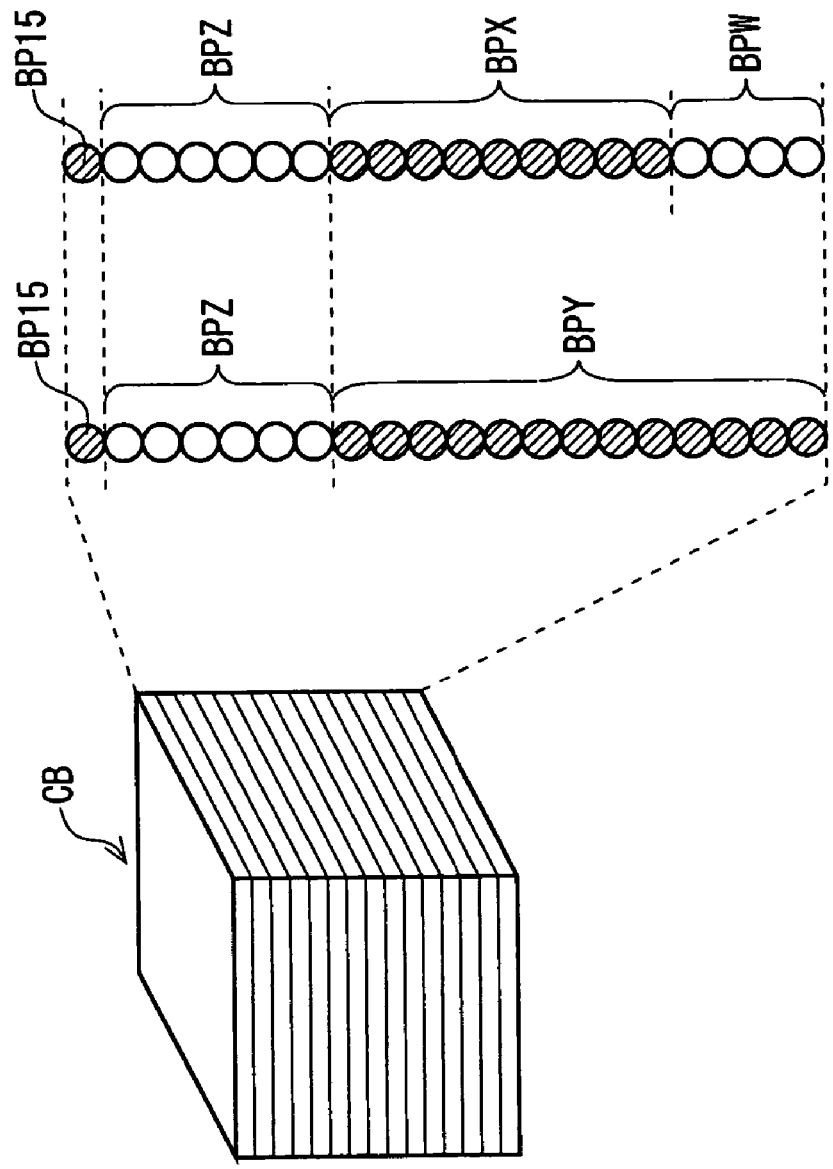

PICTURE ENCODER AND PICTURE ENCODING METHOD

BACKGROUND OF THE INVENTION

1. Field of the Invention

The present invention relates to an encoder and an encoding method which are suitably applied to encoders and encoding methods according to, for example, the standard of Joint Photographic Experts Group (JPEG) 2000.

2. Description of the Related Art

A compression method called JPEG2000 has been standardized as a new data compression method.

In the encoding method of JPEG2000 standard, there have been demands for shorter transfer periods.

SUMMARY OF THE INVENTION

The present invention has been made in view of the above situation, and proposes an encoder and an encoding method which are capable of improving the transfer efficiency necessary for an encoding process.

To achieve the above object, an encoder according to an aspect of the present invention comprises: a filtering generation means which generates a filtering coefficient by performing a filtering process on inputted picture data; a division means which divides the filtering coefficient into plural bit planes from an uppermost bit to a lowermost bit of each pixel; a read control means which removes a predetermined number of bit planes among the plural bit planes, from a lower side, thereafter reads remaining bit planes, and outputs the remaining bit planes in parallel; and plural encoding means which respectively perform encoding processings on the plural bit planes outputted in parallel from the read control means, wherein the read control means determines the number of the removed bit planes, so that a quantity of generated codes per frame is kept constant when each of the plural encoding means performs the encoding processing.

As a result of this, a predetermined number of bit planes corresponding to those parts of information that seem relatively small to users are removed, and accordingly, the encoder can prevent variation of the processing time in a stage before the encoding means respectively performs an encoding process.

Also, an encoding method according to another aspect of the present invention comprises: a first step of generating a filtering coefficient by performing a filtering processing on inputted picture data; a second step of dividing the filtering coefficient into plural bit planes from an uppermost bit to a lowermost bit of each pixel; a third step of removing a predetermined number of bit planes among the plural bit planes, from a lower side, thereafter reading remaining bit planes, and outputting the remaining bit planes in parallel; and a fourth step of performing encoding processings respectively on the plural bit planes outputted in parallel, wherein the number of the removed bit planes is determined in the third step so that a quantity of generated codes per frame is kept constant when the encoding processings are performed in the fourth step.

As a result of this, a predetermined number of bit planes corresponding to those parts of information that seem relatively small to users are removed, and accordingly, it is possible for the encoding method to prevent variation of the processing time in a stage before respective encoding processings are performed.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 4A to 4C are schematic diagrams for explaining code blocks after quantization and the contents of bit planes corresponding to the code blocks;

DETAILED DESCRIPTION OF THE INVENTION

Preferred embodiment of this invention will be described with reference to the accompanying drawings:

(1) Structure of Encoder According to Present Embodiment

Figure 1:
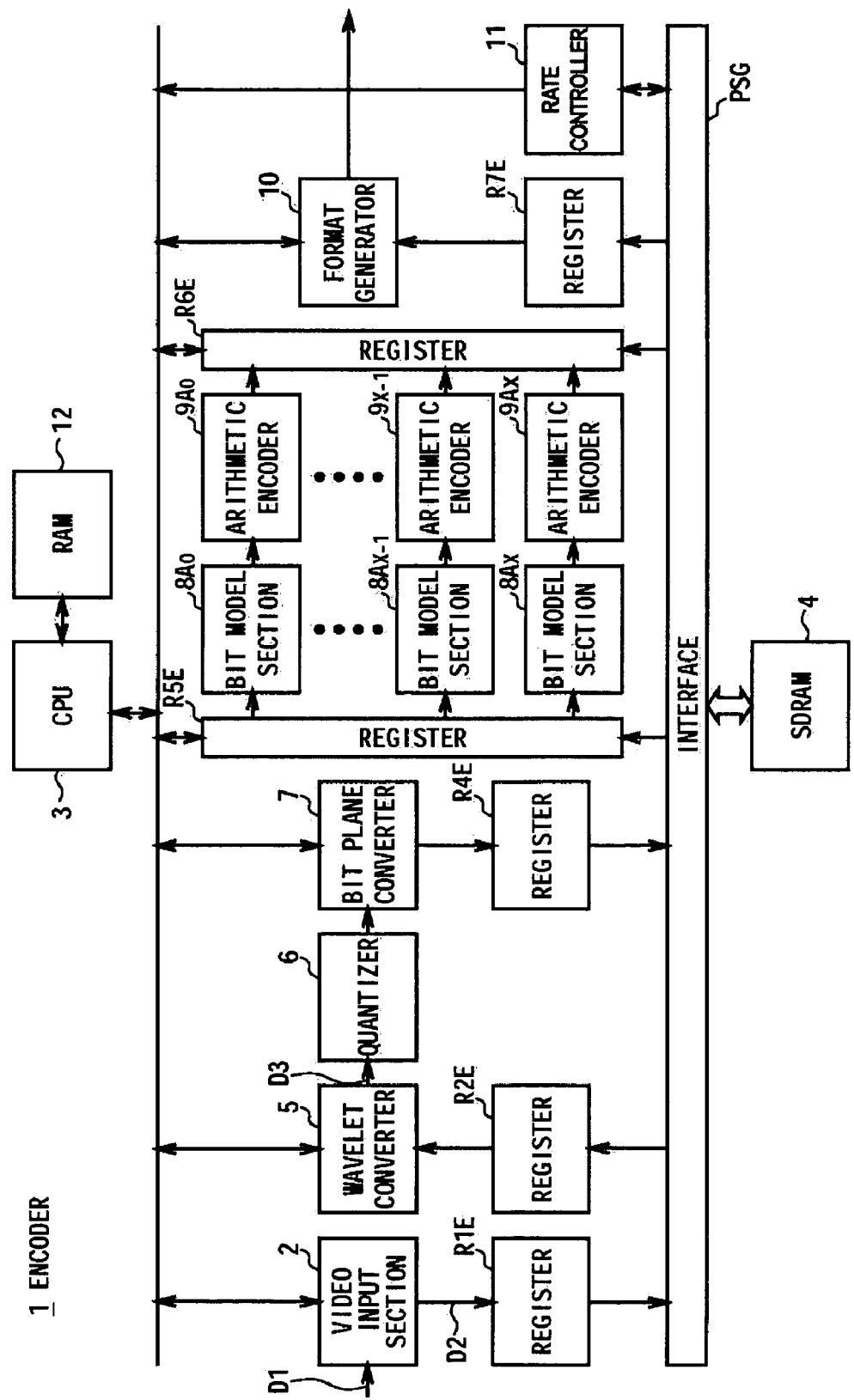
FIG. 1 is a block diagram showing the structure of an encoder according to an embodiment.

In FIG. 1, reference symbol 1 denotes an encoder. When motion-picture data D1 (e.g., standard motion-picture signals according to International Telecommunication Union-Radiocommunication's BT656 standard, or ITU-R BT656 standard) is externally inputted into a video input section 2 (VIN: Video In), video input section 2 separates motion-picture data D1 into data components D2 (luminance Y and color differences Cb and Cr) under control of a CPU 3. Video input section 2 then extracts picture-encoding areas of data components D2, and sends the picture encoding areas to a register R1E.

The register R1E stores data components D2 supplied from video input section 2, and makes data components D2 decomposed for every one frame of original motion picture data D1 to be stored in a synchronous dynamic random access memory (SDRAM) 4 via an interface PSG. At this time, register R1E is designed to generate addresses in SDRAM 4, in every one of frames for every data component D2.

Subsequently, CPU 3 reads every data component D2 stored in units of frames in the SDRAM 4, and sends data components D2 to a wavelet converter (DWT: Discrete Wavelet Transform) 5 via interface PSG and a register R2E.

At this time, register R2E manages order-of-picture information necessary for wavelet conversion which will be described later, and generates addresses in SDRAM 4 in every one of frames, for every data component D2.

Wavelet converter 5 has a dual pass filter (not shown) which serves both as a low-frequency pass type and a high-frequency pass type. A process for dividing frames based on each data component D2 is performed by using the dual pass filter, for both the frequency and time in each of the horizontal and vertical direction (i.e., wavelet conversion processing).

The wavelet conversion processing includes an operation of extracting a particular frequency band, simultaneously suppressing the low frequency at a ratio of 2:1, and repeatedly executing filtering so that the low frequency is divided recursively. Thus, frequency components are extracted step by step from the higher-frequency side (each step will hereinafter called a level).

Figure 2:
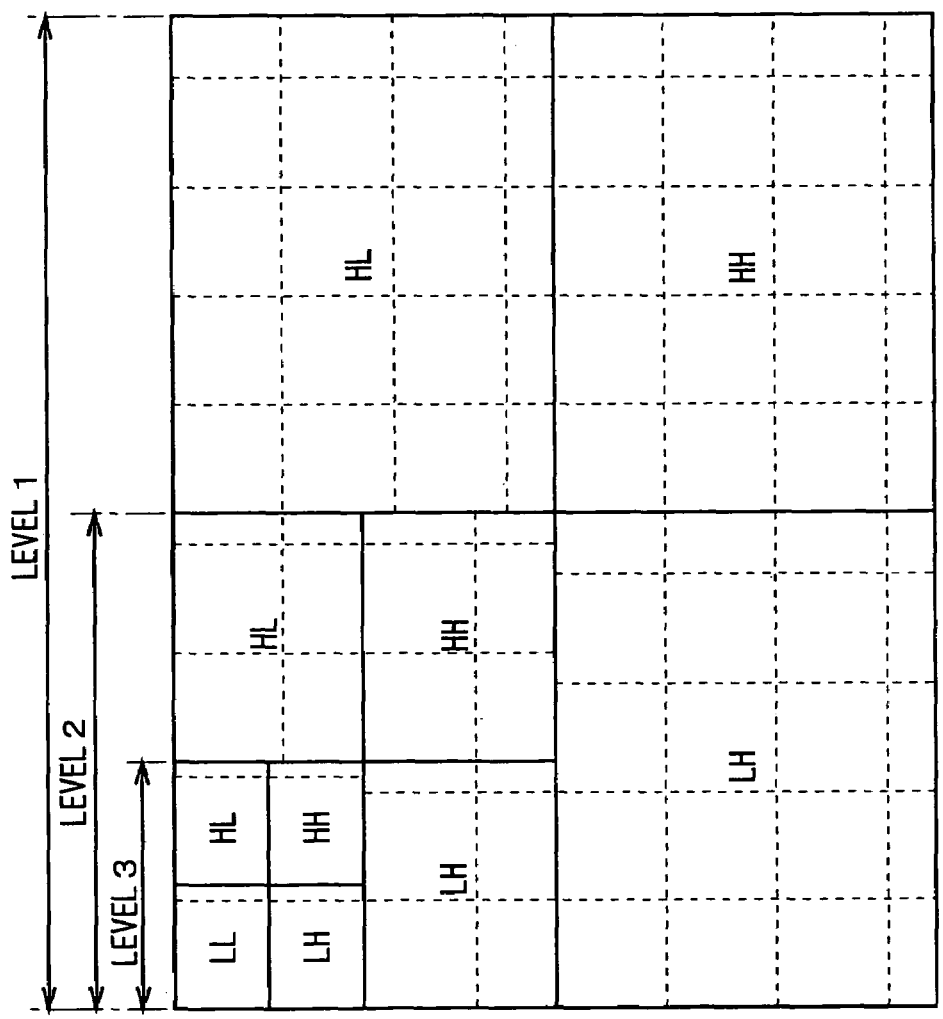
FIG. 2 is a schematic plan views for explaining wavelet conversion.

As a result of this, as shown in FIG. 2, the frame based on each data component D2 is divided, for every one of the levels (up to level 5 in the present embodiment), into: components (hereinafter called LH components) in which the horizontal direction corresponds to the low-frequency side and the vertical direction corresponds to the high-frequency side; components (hereinafter called HL components) in which the horizontal direction corresponds to the high-frequency side and the vertical direction corresponds to the low-frequency side; components (hereinafter called HH components) in which the horizontal direction corresponds to the high-frequency side and the vertical direction corresponds also to the high-frequency side; and components (hereinafter called LL components) in which the horizontal direction corresponds to the low-frequency side and the vertical direction corresponds to the low-frequency side.

Data components D3 in which frames have been divided into LH, HL, HH, and LL components for every level are quantized by a quantizer (Q: quantum) 6, and then supplied to a bit-plane converter (WTB: Word to Bitplane) 7. The LL components of each data component D3 except for the final step level are stored into SDRAM 4 via a register R4E and interface PSG directly, i.e., without being subjected to the processings made by quantizer 6 and bit plane converter 7.

Figure 3B:
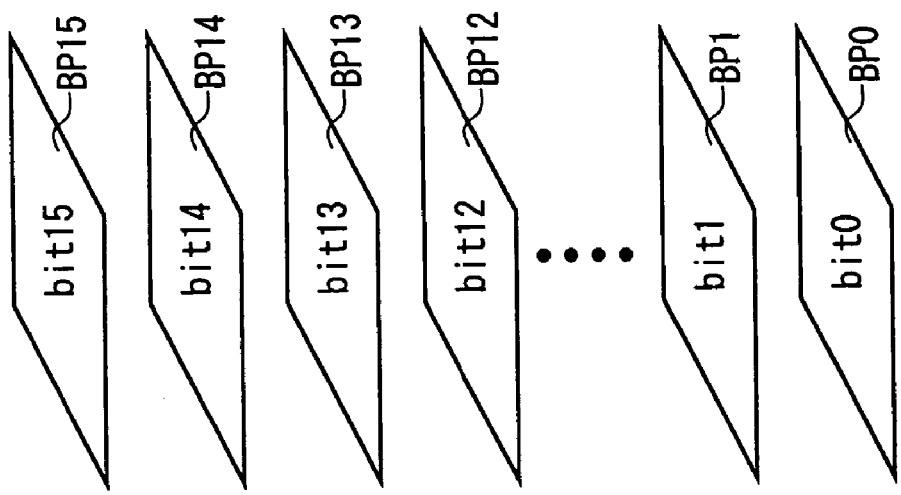
FIGS. 3A and 3B are schematic diagrams for explaining code blocks and bit planes.
Figure 3A:
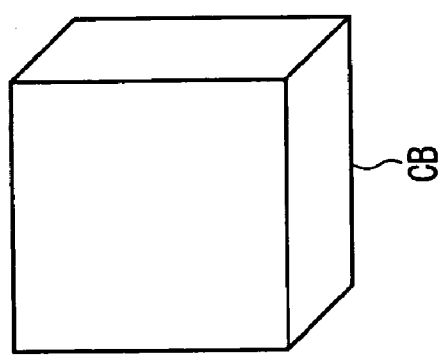

As shown in FIG. 3A, bit-plane converter 7 divides each data component D3 subjected to the wavelet conversion, into units of code blocks CB each of which consists of, for example, 64×64 (=4096) words, for every step level and for every frequency band.

Further, bit-plane converter 7 divides each code block CB (FIG. 3A) into 16 bit planes BP0 to BP15 where plane BP15 is constituted by a collection of uppermost bits (bit15) of respective pixels and plane BP0 is constituted by a collection of lowermost bits (bit0) of respective pixels. At this time, bit-plane converter 7 detects a bit plane of 0 bit (hereinafter called a zero-bit plane) for each code block with respect to each data component.

Thereafter, CPU 3 makes register R4E to store every code block CB outputted from bit-plane converter 7 while making SDRAM 4 sequentially store code blocks CB via interface PSG.

Subsequently, CPU 3 reads each bit plane stored in SDRAM 4 while sending bit planes BP0-BP15 in parallel, respectively to corresponding bit model sections (CBM: Coefficient Bit Modeling) 8A (8A0 to 8Ax (X=15 in the present embodiment)) and subsequently to arithmetic encoders (AC: Arithmetic) 9A (9A0 to 9Ax).

At this time, each of bit planes BP (hereinafter called processing bit planes) read from SDRAM 4 has a quantity of bits that has a value of one, and the quantities for bits of value one are different for different bit planes for every code block. Hence, CPU 3 is designed to control input/output states of a register R5E, in order to prevent the processing time of each of bit model sections 8A corresponding respectively to the code blocks from varying.

Code blocks CB after quantization are each constituted by 16 bit planes, as shown in FIG. 4A. Also as shown in this figure, each code block CB includes a bit plane BP15 (hereinafter called a code bit plane) which indicates whether the uppermost bit is positive or negative, lower several zero bit planes BPZ, and much lower several processing bit planes BPY.

Further, CPU 3 monitors the bit planes sent from bit-plane converter 7 via register R4E while executing a rate control so that only necessary bit planes are sent to register R5E.

Bit model sections 8A create contexts corresponding respectively to the bits of each bit plane in each code block supplied in parallel from register R5E, and thereafter send the contexts respectively to corresponding arithmetic encoders 9A in synchronization with the bits.

Bit model sections 8A output respectively the bits and corresponding contexts, in the order in which arithmetic encoding is carried out by arithmetic encoders 9A.

Arithmetic encoders 9A are designed to perform entropy encoding according to the JPEG2000 standard, independently for every bit plane. Therefore, CPU 3 settles the numbers of necessary bit planes to be supplied respectively to bit model sections 8A, in order to encode only the least necessary bit planes.

That is, among the above-mentioned 16 bit planes shown in FIG. 4B, several lowest processing bit planes BPY are regarded as non-processing bit planes BPW (FIG. 4C), so that only the remaining processing bit planes BPX (X: Y-W) are regarded as targets to be processed.

Further, arithmetic encoders 9A calculate generation probabilities for the contexts, respectively, with respect to the bits sent from corresponding bit model sections 8A to create encoded streams.

The arithmetic encoding method of the present embodiment differs from generally used arithmetic encoding methods in the following points. First, inputted bits are of "0" or "1". Second, the inputted bits are not encoded but More Probable Symbol (MPS) and Less Probable Symbol (LPS) are encoded. Third, the generation probabilities of the inputted bits are learned in accordance with the inputted bits. Fourth, multiplications for divisions into segments are approximated by additions.

Thereafter, CPU 3 stores the code blocks after the encoding, which are respectively outputted from arithmetic encoders 9A, into a register R6E while making SDRAM 4 to store the code blocks as encoded streams, via interface PSG.

At this time, the time required for the encoding processing differs among arithmetic encoders 9A. Therefore, CPU 3 monitors arithmetic encoders 9A and controls register R6E to store one after another for every particular encoded stream created.

Subsequently, CPU 3 reads only those encoded streams that are determined by a rate control from the encoded streams stored in SDRAM 4 while sending those streams to a format generator (FMT: format) 10 via interface PSG and a register R7E.

The encoded streams read from SDRAM 4 by CPU 3 via register R6E are code strings subjected to entropy coding. Therefore, format generator 10 rearranges the encoded streams in a desired order and adds additional information (headers) to the streams, to create data streams according to the JPEG2000 standard, which are outputted to the outside.

CPU 3 is connected to a random access memory (RAM) 12 as a working memory so that various data can be read or written upon necessities.

(2) Method of Settling The Number of Encoded Bit Planes

The bit planes which are cut off by the transfer rate control need not be subjected to the processings of bit model sections 8A or arithmetic encoders 9A, as a result of the cutting off of the non-processing bit planes BPW (FIG. 4C). However, the transfer rate control is performed on the basis of the quantities of generated codes which are calculated by arithmetic encoders 9A. Also, the quantities of generated codes can be estimated from the coefficients of respective bit planes by a simple calculation method without performing the processing in bit model sections 8A or arithmetic encoders 9A. The quantity of generated codes thus calculated in this method is called an estimated generated code quantity.

Figure 12:
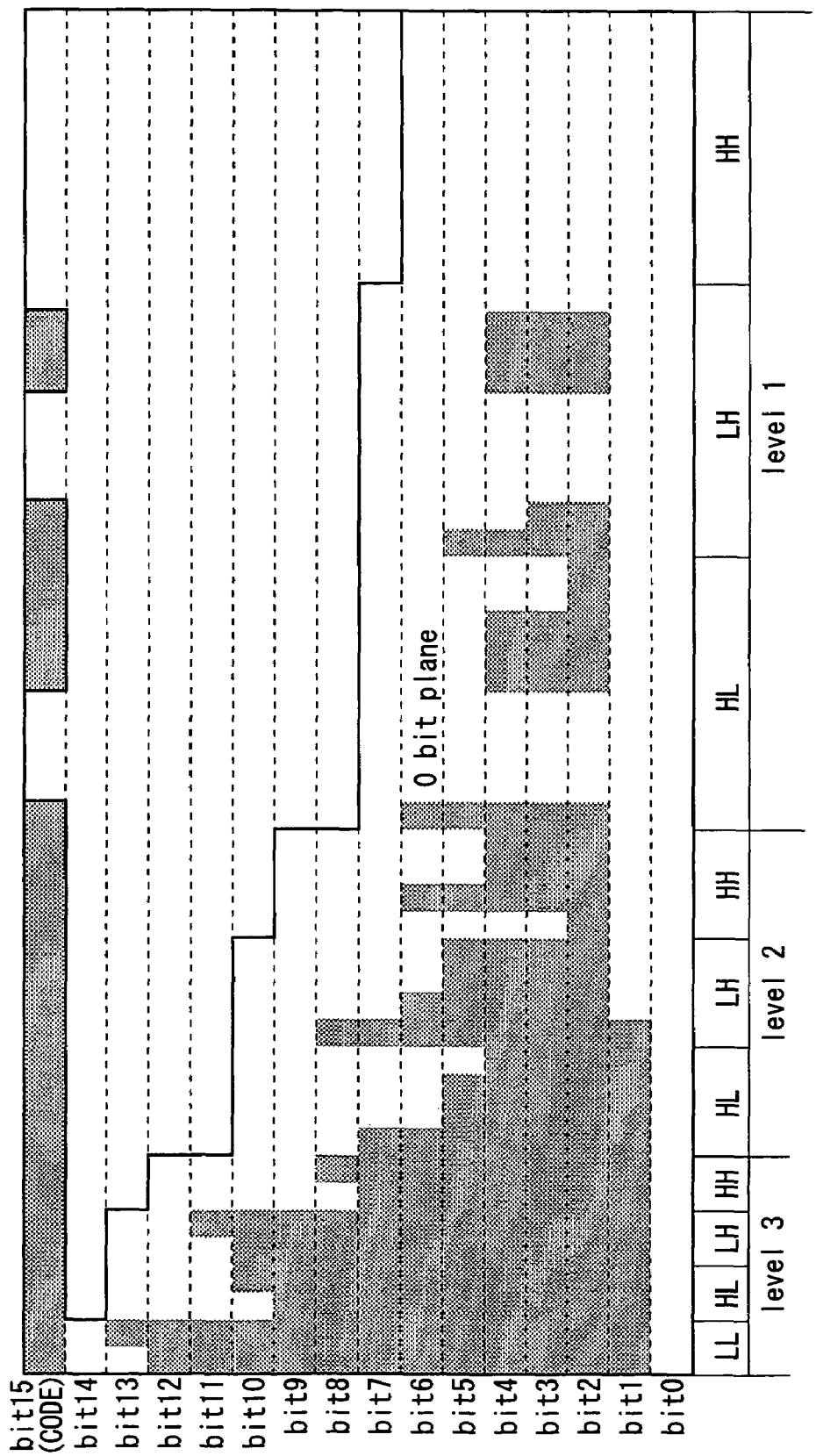
FIG. 12 is a plan view for explaining quantities of generated codes in respective bit planes accumulated for one frame.

With respect to the estimated generated code quantities, necessary bit planes are settled to be processing bit planes by the same method as that of the transfer rate control. Naturally, the estimated generated code quantities differ from the quantities of generated codes which are obtained by performing the processing in bit model sections 8A and arithmetic encoders 9A. Therefore, the settled necessary bit planes with extra margins are taken as the processing bit planes. For example, provided that the hatched parts in FIG. 12 are the necessary bit planes obtained from the estimated generated code quantities, processing bit planes are determined by adding another 1 bit plane to each code block.

As described above, CPU 3 controls register R5E to control the number of bit planes of each code block supplied to bit model sections 8A. Thus, CPU 3 minimizes the processing time in each of arithmetic encoders 9A corresponding respectively to bit model sections 8A.

At this time, CPU 3 settles the number of necessary bit planes supplied to each bit model section 8A while CPU 3 cuts off unnecessary bit planes (in the LSB side). The method of settling the number of necessary bit planes will be described below.

Figure 5:
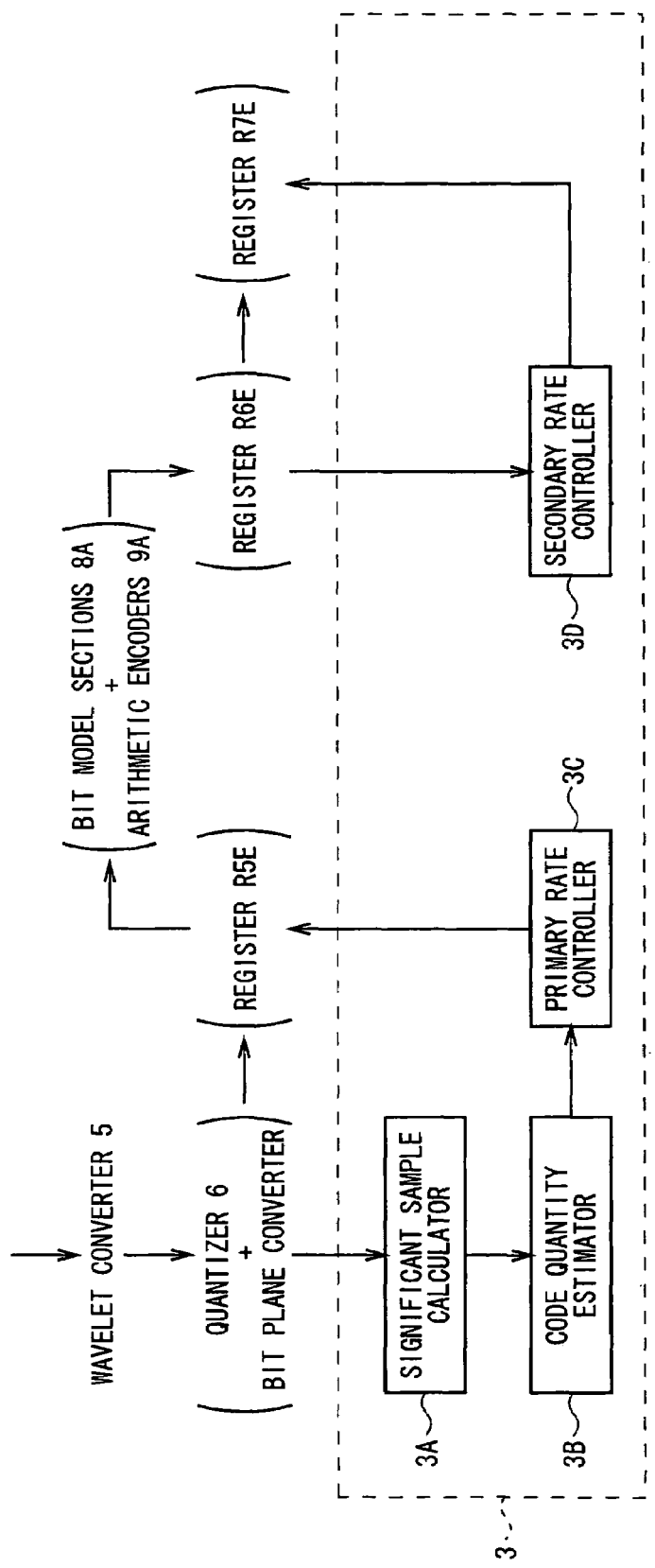
FIG. 5 is a schematic diagram for explaining functional blocks of a CPU.

Specifically, CPU 3 has an algorithm, which is represented by functional blocks in FIG. 5, and includes a significant sample calculator 3A, a code quantity estimator 3B, a primary rate controller 3C, and a secondary rate controller 3D.

At first, significant sample calculator 3A in CPU 3 calculates and outputs the number of samples which become "significant" for the first time, with respect to each bit plane in each code block.

Figure 6:
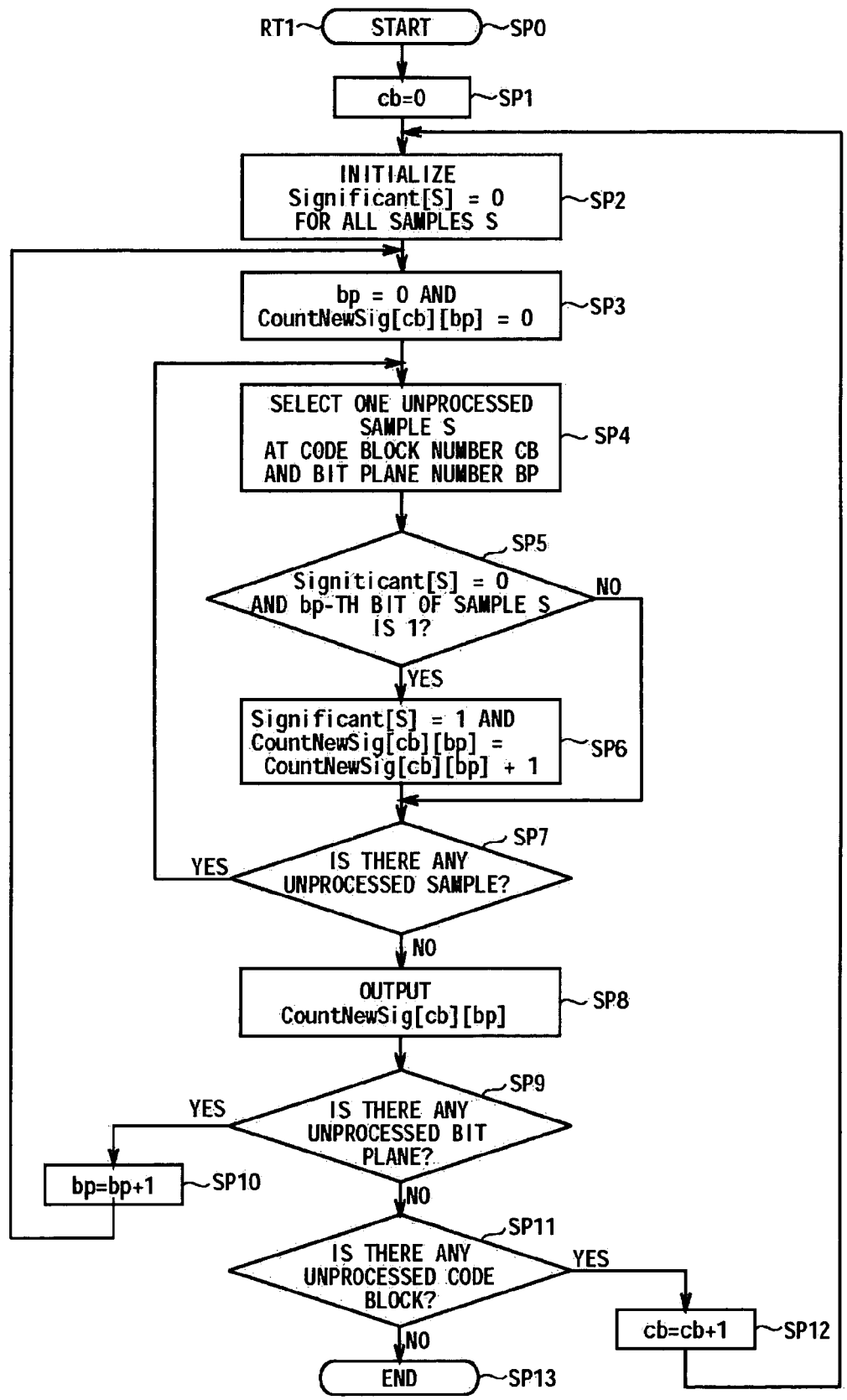
FIG. 6 is a flowchart for explaining a significant sample calculation processing procedure.

More specifically, CPU 3 starts a significant sample calculation procedure RT1 as shown in FIG. 6 from step SP0. In a subsequent step SP1, a code block number cb is set to "0" and the procedure then goes to step SP2 to initialize significant [S] to "0" with respect to all samples S.

CPU 3 then goes to step SP3 and sets a bit plane number bp to 0 as well as CountNewSig [cb][bp] to 0, where CountNewSig [cb][bp] is the number of samples which become "significant" (a significant state, i.e., the bit which has already been "1" is taken as having been coded) for the first time at bit plane number bp at code block number cb. Thereafter, CPU 3 goes to step SP4. Bit plane numbers bp are assigned in the order from the MSB side toward the LSB side.

In step SP4, CPU 3 selects one unprocessed sample S at code block number cb and at bit plane number bp, and thereafter goes to step SP5, to determine whether the bit whose significant [S] is 0 and whose bit plane number bp is in sample S is "1" or not.

If a positive result is obtained in step SP5, CPU 3 goes to step SP6 and sets significant [S] to 1 and adds 1 to Count-NewSig [cb][bp]. Thereafter, CPU 3 goes to step SP7. Otherwise, if a negative result is obtained in step SP5, CPU 3 goes directly to step SP7.

Next in step SP7, CPU 3 determines whether there are any unprocessed samples or not. If a positive result is obtained, CPU 3 returns to step SP4 again and repeats the same processing as described above. Otherwise, if the result is negative, CPU 3 goes to step SP8 and outputs CountNewSig [cb][bp] to code quantity estimator 3B in a later stage.

CPU 3 then goes to step SP9 and determines whether there is any unprocessed bit plane. If a positive result is obtained, CPU 3 goes to step SP10 and adds "1" to bit plane number bp. CPU 3 thereafter returns to step SP3 again and repeats the same processing as described above. Otherwise, if a negative result is obtained, CPU 3 goes directly to step SP11, determining that all bit planes have been processed.

In step SP11, CPU 3 determines whether there are any unprocessed code blocks. If a positive result is obtained, CPU 3 goes to step SP12 and adds "1" to code block number cb. CPU 3 thereafter returns to step SP2 and repeats the same processing as described above. Otherwise, if a negative result is obtained, CPU 3 goes to step SP13, determining that all code blocks have been processed, and terminates the significant sample calculation processing procedure RT1.

Thus, significant sample calculator 3A in CPU 3 can calculate and output the number of samples which become significant for the first time, with respect to each bit plane in each code block.

Subsequently, code quantity estimator 3B in CPU 3 outputs an estimated value of the quantity of codes generated in each bit plane in each code block. Further, primary rate controller 3C in CPU 3 is inputted with the estimated code quantity for every bit plane and performs control based on fixed bit truncation (rounding down), to output the number of necessary bit planes for all the code blocks.

Note that secondary rate controller 3D in CPU 3 is designed to perform rate control based on the fixed bit truncation in a manner as follows. That is, rate controller 3D is inputted with not only the estimated code quantity for every bit plane but also a quantity (hereinafter called a target code quantity) to control the transfer rate in order to keep the quantity of generated codes per frame constant, as will be described later.

Figure 7:
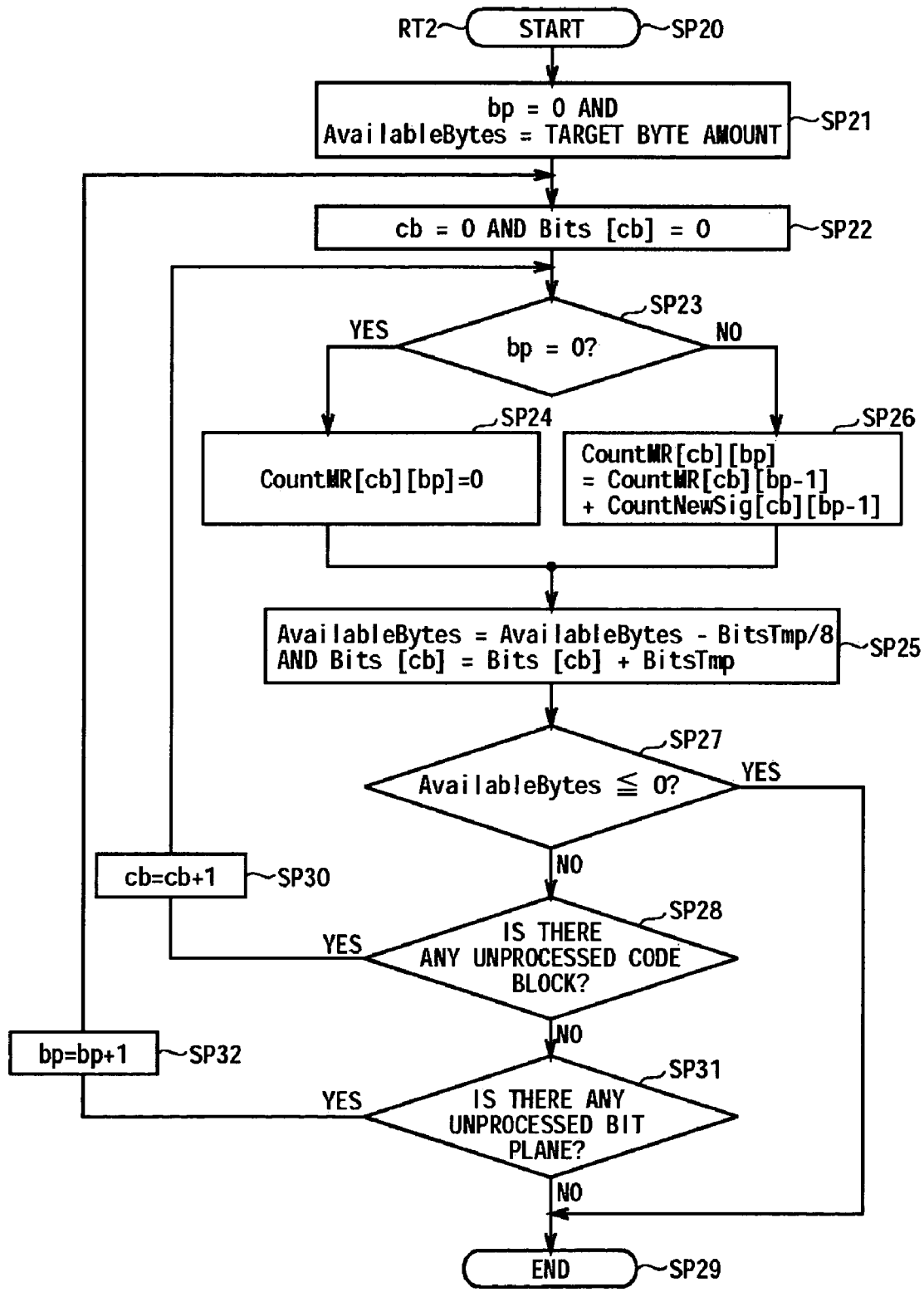
FIG. 7 is a flowchart for explaining code quantity estimation and a primary rate control processing procedure.

Specifically, CPU 3 starts code quantity estimation and a primary rate control processing procedure RT2, as shown in FIG. 7, from step SP20. In subsequent step SP21, CPU 3 sets bit plane number bp to "0" as well as the number of available bytes (or byte amount) to a target byte amount. Thereafter, CPU 3 goes to step SP22, and initializes code block number cb to "0" as well as an estimated code quantity Bits [cb] to "0".

Further, CPU 3 goes to step SP23 and determines whether bit plane number bp is "0" or not. If a positive result is obtained, CPU 3 goes to step SP24 and sets CountMR

[cb][bp] to 0, and then goes to step SP25. Otherwise, if a negative result is obtained in step SP23, CPU 3 goes to step SP26 and sets CountMR [cb][bp] which expresses the number to be subjected to magnitude refinement (MR) using bit plane number bp at code block number cb, to a value decided by adding CoutMR [cb][bp−1] and CountNewSig [cb][bp−1] of the preceding plane number. Thereafter, CPU 3 goes to step SP25. Note that CountMR [cb][bp] is defined as $\Sigma$ (i=0 to bp−1) CountNewSig [cb][i] where i=0 to bp−1.

In step SP25, CPU 3 expresses a temporal estimated code quantity BitsTmp as CountNewSig [cb][bp]×RatioNewSig+ CountMR[cb][bp]×RatioMR, where RatioNewSig and RatioMR are parameters. Also, CPU 3 converts the amount of available bytes (AvailableBytes) by subtracting therefrom the temporal estimated code quantity BitsTmp divided by 8 and rounding down decimals, and adds temporal estimated code quantity BitsTmp to estimated code quantity Bits [cb].

Subsequently, in step SP27, CPU 3 determines whether the amount of available bytes is 0 or less or not. If a negative result is obtained, CPU 3 goes to step SP28, and determines whether there is any unprocessed code block or not. Otherwise, if a positive result is obtained, CPU 3 directly goes to step SP29 and terminates the code quantity estimation and the primary rate control processing procedure RT2.

If a positive result is obtained in step SP28, CPU 3 goes to step SP30 and adds "1" to code block number cb. Thereafter, CPU 3 returns to step SP23 and repeats the same processing as described above. Otherwise, if a negative result is obtained, CPU 3 goes to step SP31, determining that all the code blocks have been processed.

In step SP31, CPU 3 determines whether there is any unprocessed bit plane or not. If a positive result is obtained, CPU 3 goes to step SP32 and adds "1" to bit plane number bp. Thereafter, CPU 3 returns to step SP22 again and repeats the same processing as described above. Otherwise, if a negative result is obtained, CPU 3 goes directly to step SP29, determining that all the bit planes have been processed, and terminates the code quantity estimation and the primary rate control processing procedure RT2.

Thus, code quantity estimator 3B and primary rate controller 3C in CPU 3 can output an estimated code quantity of codes to be generated in each bit plane in each code block, and can settle the number of bit planes necessary for all the code blocks, based on the estimated code quantity of each bit plane.

(3) Rate Control

CPU 3 (secondary rate controller 3D shown in FIG. 5) selects components in the order from luminance Y to color differences Cb and Cr, in the direction from the MSB side toward the LSB side in the order from the lower frequency side to the higher frequency side until a target code quantity is obtained for each of the bit planes, referring to the target code quantity to control the transfer rate, in order that the quantity of generated codes per frame which are sent from the format generator 10 is kept constant.

In the above-described method of settling the number of coded bit planes, the number of necessary bit planes is settled with respect to the estimated code quantity. However, the rate control is designed to perform control using fixed bit truncation, based on the quantities of generated codes obtained by performing the processing in bit model sections 8A and arithmetic encoders 9A.

Figure 13:
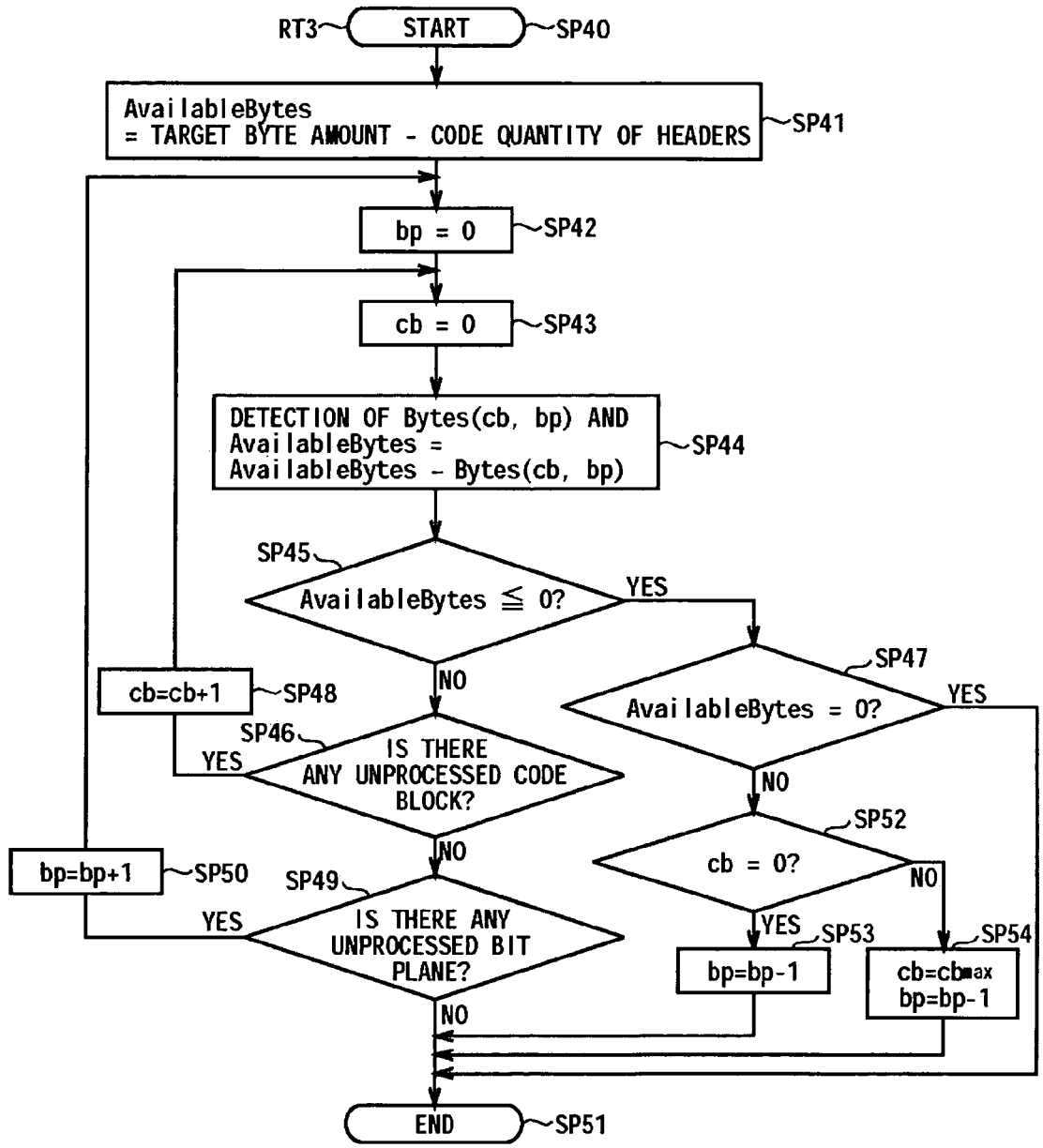
FIG. 13 is a flowchart for explaining a generated code quantity estimation processing procedure.

Specifically, CPU 3 starts a generated code quantity estimation processing procedure RT3 shown in FIG. 13, from step SP40. In subsequent step SP41, the amount of available bytes (AvailableBytes) is set to a value obtained by subtracting the quantity of headers (e.g., main headers, tile-part headers, and packet headers) from the target byte amount.

Note that the quantity of code for headers needs to be calculated and estimated in advance so that the whole coded streams have a quantity within the target code quantity. In this case, the quantity of codes of packet headers cannot be settled, and hence, an approximate value is used as a prerequisite.

CPU 3 then goes to step SP42, and sets bit plane number bp to "0". CPU 3 further goes to step SP43 and sets code block number cb to "0".

Subsequently, CPU 3 goes to step SP44 and detects the amount of bytes (cb, bp), i.e., the quantity of actually generated codes for code block number cb and bit plane number bp. Also, CPU 3 subtracts the amount of bytes (cb, bp) from the amount of available bytes (AvailableBytes), and then, goes to step S45.

In step SP45, CPU 3 determines whether the amount of available bytes is 0 or less. If a negative result is obtained, CPU 3 goes to step SP46 and determines whether there is an unprocessed code block or not. Otherwise, if a positive result is obtained, CPU 3 goes to step SP47.

If a positive result is obtained in step SP46, CPU 3 goes to step SP48 and adds "1" to code block number cb. Thereafter, CPU 3 returns to step SP43 again and repeats the same processing as described above. Otherwise, if a negative result is obtained, CPU 3 goes to step SP49, determining that all the code blocks have been processed.

In step SP49, CPU 3 determines whether there is an unprocessed bit plane or not. If a positive result is obtained, CPU 3 goes to step SP50 and adds "1" to bit plane number bp. Thereafter, CPU 3 returns to step SP42 again, and repeats the same processing as described above. Otherwise, if a negative result is obtained, CPU 3 goes directly to step SP51, determining that all the bit planes have been processed. CPU 3 then terminates the generated code quantity estimation processing procedure RT3.

In contrast, in step SP47 which follows the positive result of step SP45, CPU 3 determines whether the amount of available bytes is 0 or not. If a negative result is obtained, CPU 3 goes to step SP 52 and determines whether code block number cb is "0" or not. Otherwise, if a positive result is obtained, CPU 3 goes directly to step SP51 and terminates the generated code quantity estimation processing procedure RT3.

If code block number cb is determined to be "0" in step SP52, CPU 3 goes to step SP53 and subtracts "1" from code block number cb. Thereafter, CPU 3 goes to step SP51 and terminates the generated code quantity estimation processing procedure RT3.

Otherwise, if code block number cb is not determined to be "0" in step SP52, CPU 3 goes to SP54, and sets code block number cb to a maximum value cbmax. Also, CPU 3 subtracts "1" from bit plane number bp. Thereafter, CPU 3 goes to step SP51 and terminates the generation code quantity estimation processing procedure RT3.

Figure 8:
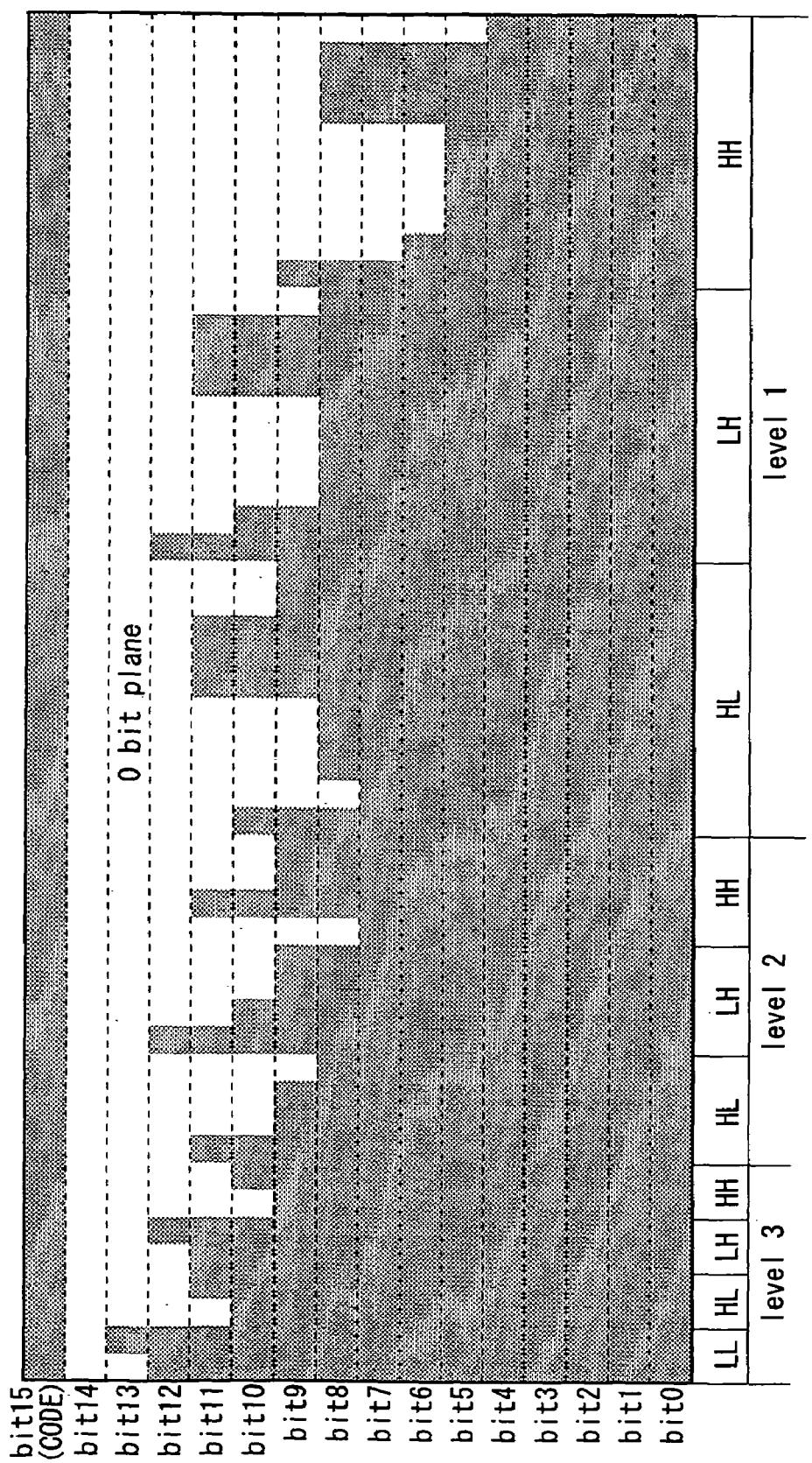
FIG. 8 is a plan view for explaining quantities of generated codes in respective bit planes accumulated for one frame.

FIG. 8 shows a state where quantities of generated codes in each bit plane and calculated by arithmetic encoders 9A are accumulated for one frame. The number of code blocks is expressed where bit planes are assigned to the ordinate axis as well as code blocks to the abscissa axis.

In the example of the division of code blocks shown in FIG. 2, two components at level 3, six components at level 2, and twenty components at level 1 constitute a total of eighty six components. In FIG. 8, hatched parts are bit planes which include streams, i.e., significant bit planes in each of which the quantity of generated codes is not zero. Zero bit planes detected by bit plane converter 7 do not generate codes.

Figure 9:
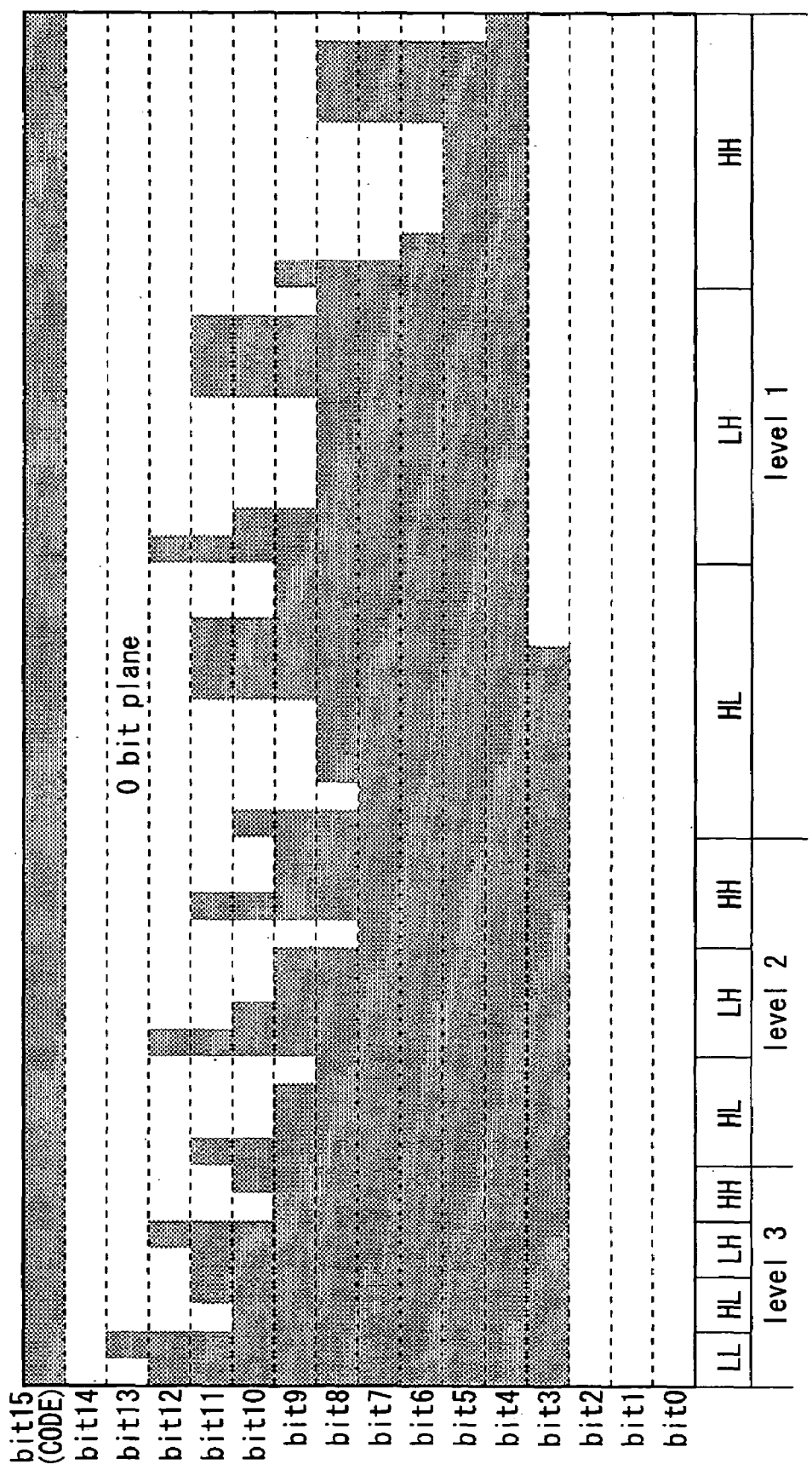
FIG. 9 is a plan view for explaining quantities of generated codes in respective bit planes accumulated for one frame.

Here, with respect to the significant bit planes (hatched parts in FIG. 8), the quantities of generated codes are integrated in the order from the bits of the MSB side and from the higher level (i.e., the left upper side in FIG. 8). If a target code quantity is exceeded as a result of continuing the integration, the bit planes are terminated at the maximum integration result which does not exceed the target code quantity. Specifically, in FIG. 9, the bit planes are terminated at bit 3 in the ordinate axis and in the middle of the HL components at level 1 in the abscissa axis. Otherwise, if the target code quantity is not exceeded after continuing the integration, all the bit planes are integrated. Thus, the integrated bit planes are settled as necessary bit planes (hatched parts in FIG. 9).

In practice, the hierarchical levels and bands of respective wavelets are weighted. That is, the coefficients obtained from wavelet converter 5 (FIG. 1) are quantized by quantizer 6.

Figure 10:
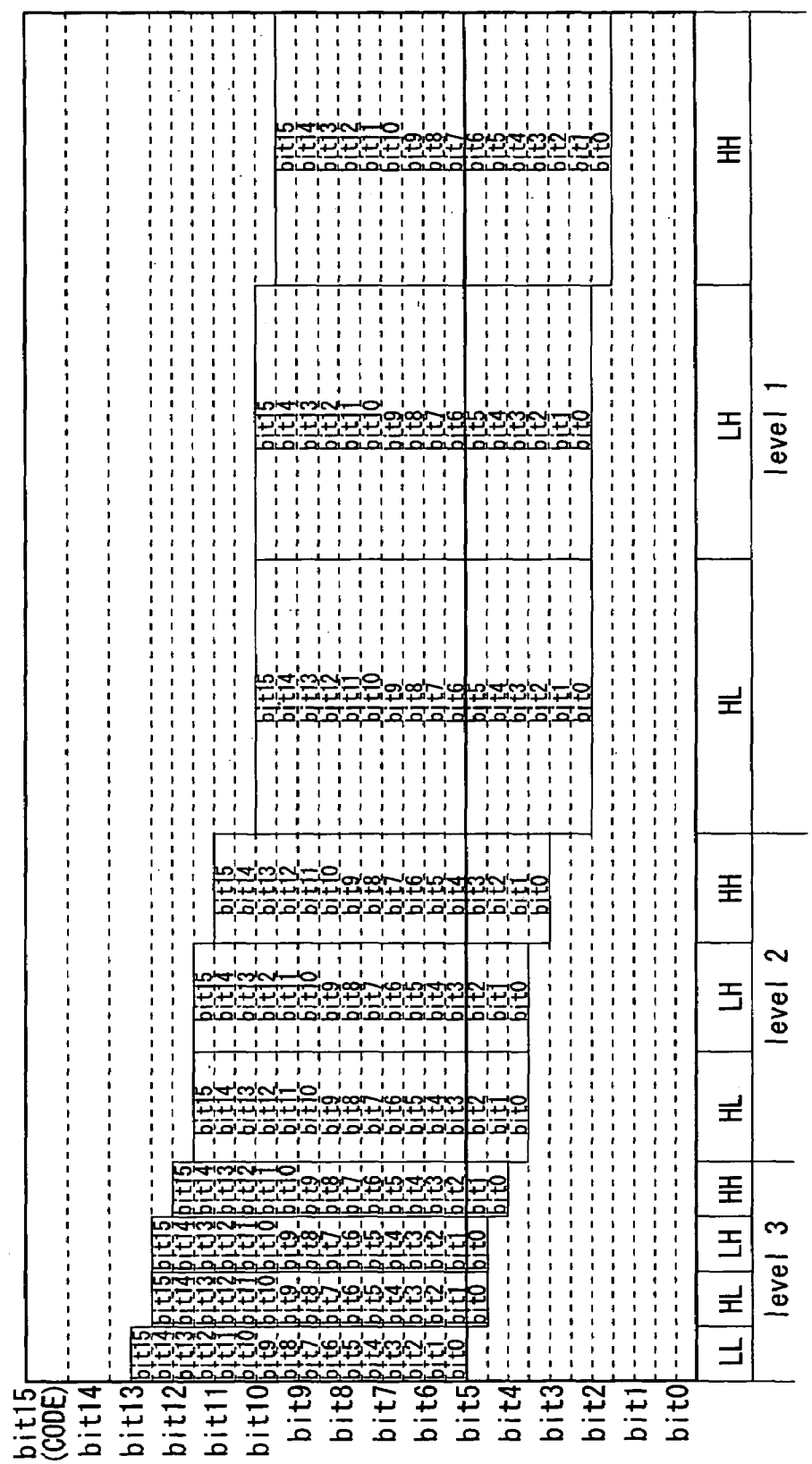
FIG. 10 is a plan view for explaining quantities of generated codes in respective bit planes accumulated for one frame.

In another example shown in FIG. 10, quantization is performed such that LL components at level 3 are divided by 1 (i.e., not quantized), HL and LH components at level 3 are divided by 2, and HH components at level 3 are divided by 4. Quantization is performed such that HL components and LH components at level 2 are divided by 16, and HH components at level 2 are divided by 32. Further, HL and LH components at level 1 are divided by 128 and HH components at level 1 are divided by 256.

Figure 11:
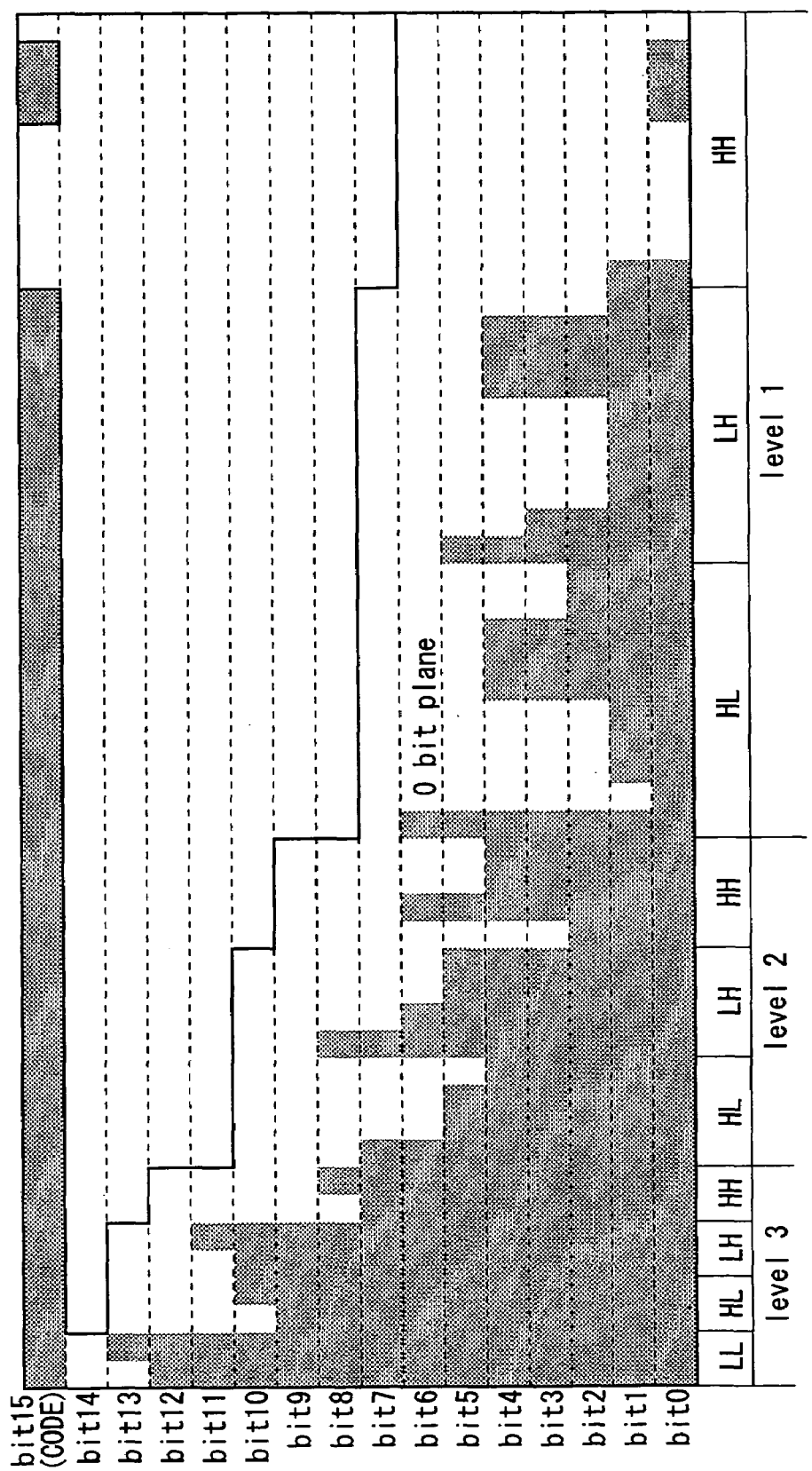
FIG. 11 is a plan view for explaining quantities of generated codes in respective bit planes accumulated for one frame.

Thus, the transfer rate is controlled with respect to quantized bit planes as shown in FIG. 11 corresponding to FIG. 8, and necessary bit planes are settled as shown in FIG. 12.

Thus, with respect to each bit plane in each code block, CPU 3 selects components in the order from luminance Y to color differences Cb and Cr, in the direction from the MSB side toward the LSB side in the order from the lower frequency side to the higher frequency side, until a target code quantity is reached for each of the units of bit planes. As a result, the rate control based on fixed bit truncation can be achieved finally.

Although it has been described that the transfer rate is controlled by CPU 3, it is appreciated that encoder 1 may further include a rate controller 11, as shown in FIG. 1, to control the transfer rate.

(4) Operations and Advantages of the Embodiment

In the structure as described above, encoder 1 of FIG. 1 divides respective data components D3 subjected to wavelet conversion, for every hierarchical level and every frequency band, regarding each word having a predetermined size as a code block. Thereafter, each of the code blocks is divided into plural bit planes from the uppermost bit to the lowermost bit for every pixel.

At this time, data in units of code blocks which are read from SDRAM 4 and supplied to register R5E is subjected to rate control so as to maintain significant bit planes having bits in the MSB side and a higher level among the plural bit planes, and to cut off lower bit planes (in the LSB side) to which small information is assigned.

As a result of this, bit model sections 8A respectively create contexts corresponding to bits in the bit planes in each of the code blocks supplied in parallel from register R5E.

Thereafter, corresponding arithmetic encoders 9A perform orderly the entropy encoding processing according to the JPEG2000 standard, synchronizing the contexts respectively with the bits. At this time, the processing can be achieved in a minimum necessary time.

Further, arithmetic encoders 9A calculate generation probabilities respectively for the contexts, with respect to the bits supplied from corresponding bit model sections 8A. Thereafter, streams are sent to format generator 10 via SDRAM 4, in a manner in which the quantity of generated codes per frame is kept constant by selecting components in the order from luminance Y to color differences Cb and Cr, in the direction from the MSB side toward the LSB side in the order from the lower frequency side to the higher frequency side, until a target code quantity is obtained for every unit of bit planes, based on the calculation results from arithmetic encoders 9A, with respect to each bit plane in each code block. Format generator 10 rearranges the streams in a desired order and adds headers, to create encoded streams.

According to the structure as described above, the data transfer rate is controlled so that the quantity of generated codes per frame is kept constant, by removing those parts that represent relatively small information to users, when encoder 1 performs the encoding processing according to the JPEG2000 standard. The time required for the encoding processing can thus be reduced to the minimum, and accordingly, the transfer efficiency in the encoding processing can be improved. Further, the quantity of generated codes is estimated prior to bit model sections 8A and arithmetic encoders 9A, so that the processing performed in bit model sections 8A and arithmetic encoders 9A can be minimized.

(5) Other Embodiments

As described above, the present embodiment has been described with respect to a case where an encoder having the structure shown in FIG. 1 is applied to an encoder according to the present invention. However, the present invention is not limited to this case but is applicable widely to other various structures as far as a predetermined number of bit planes corresponding to those parts of information that seem relatively small to users are removed to improve the transfer efficiency in the encoding processing and the time for the encoding processing can be reduced to the minimum.

Also, the present embodiment has been described with respect to a case as follows. That is, wavelet converter 5 shown in FIG. 1 is applied as a filtering generation means which divides data into code blocks (filtering coefficients) with use of wavelet coefficients subjected to wavelet conversion in units of frames. Thus, low frequency components are recursively and hierarchically extracted from the higher frequency side of picture data. Thereafter, the picture data is divided into respective code blocks for every hierarchical level and every frequency band. However, the present invention is not limited to this case but is applicable widely to other various structures as far as filtering coefficients can be generated by performing filtering processings on inputted picture data.

Also, the present embodiment has been described with respect to a case where bit plane converter 7 shown in FIG. 1 is applied as a division means which divides code blocks (filtering coefficients) divided by the filtering generation means, further into plural bit planes from the uppermost bit to the lowermost bit of each pixel. However, the present invention is not limited to this case but is applicable widely to other various structures.

Also, the present embodiment has been described with respect to a case where the plural bit planes divided by bit plane converter (division means) 7 are stored in SDRAM 4 (FIG. 1). However, the present invention is not limited to this case but is applicable to a storage means having other various structures.

Also, the present embodiment has been described with respect to a case where CPU 3 is applied as a read control means which removes a predetermined number of bit planes among the plural bit planes stored in SDRAM 4 from the lower side and thereafter reads out and outputs only the remaining bit planes respectively in parallel. However, the present invention is not limited to this case but is applicable widely to other various structures.

As described above, according to the present invention, an encoder comprises: a filtering generation means which generates a filtering coefficient by performing a filtering process on inputted picture data; a division means which divides the filtering coefficient into plural bit planes from an uppermost bit to a lowermost bit of each pixel; a read control means which removes a predetermined number of bit planes among the plural bit planes, from a lower side, thereafter reads remaining bit planes, and outputs the remaining bit planes in parallel; and plural encoding means which respectively perform encoding processing on the plural bit planes outputted in parallel from the read control means, wherein the read control means determines the number of the removed bit planes, so that a quantity of generated codes per frame is kept constant when each of the plural encoding means performs the encoding processing. Therefore, a predetermined number of bit planes corresponding to those parts of information that seem relatively small to users are removed, and accordingly, the encoder can prevent variation of the processing time in a stage before the encoding means respectively perform encoding processing. It is thus possible to realize an encoder capable of greatly improving the transfer efficiency in the encoding processing.

Also, according to the present invention, the encoding method comprises: a first step of generating a filtering coefficient by performing a filtering processing on inputted picture data; a second step of dividing the filtering coefficient into plural bit planes from an uppermost bit to a lowermost bit of each pixel; a third step of removing a predetermined number of bit planes among the plural bit planes, from a lower side, thereafter reading remaining bit planes, and outputting the remaining bit planes in parallel; and a fourth step of performing encoding processing respectively on the plural bit planes outputted in parallel, wherein the number of the removed bit planes is determined in the third step so that a quantity of generated codes per frame is kept constant when the encoding process is performed in the fourth step. Therefore, a predetermined number of bit planes corresponding to those parts of information that seem relatively small to users are removed, and accordingly, it is possible for the encoding method to prevent variation of the processing time in a stage before respective encoding process is performed. It is thus possible to realize an encoding method capable of greatly improving the transfer efficiency in the encoding process.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An encoder comprising:
   filtering generation means for generating a filtering coefficient by performing a filtering process on inputted picture data;
   division means for dividing the filtering coefficient into plural bit planes from an uppermost bit to a lowermost bit of each pixel;
   read control means for removing a predetermined number of bit planes among the bit planes, from a lower side, for reading remaining bit planes, and for outputting the remaining bit planes in parallel; and
   a plurality of encoding means for encoding the bit planes outputted in parallel from the read control means, wherein
   the read control means determines the predetermined number of the removed bit planes, so that a quantity of generated codes per frame is kept constant when each of the encoding means performs the encoding.

2. The encoder according to claim 1, wherein
   the read control means removes the predetermined number of bit planes, from the lower side and from a lower hierarchical level, from bit planes stored in storage means.

3. The encoder according to claim 1, further comprising
   rate control means for feeding forward in order that the quantity of generated codes per frame is kept constant, based on results of the encoding process of the plural encoding means.

4. An encoding method comprising:
   generating a filtering coefficient by performing a filtering process on inputted picture data;
   dividing the filtering coefficient into plural bit planes from an uppermost bit to a lowermost bit of each pixel;
   removing a predetermined number of bit planes among the plural bit planes, from a lower side, thereafter reading the remaining bit planes, and outputting the remaining bit planes in parallel; and
   encoding the bit planes outputted in parallel, wherein
   the predetermined number of the removed bit planes is determined in the removing step so that a quantity of generated codes per frame is kept constant when encoding the bit planes.

5. The encoding method according to claim 4, wherein,
   removing the predetermined number of bit planes comprises removing the predetermined number of bit planes from the lower side and from a lower hierarchical level.

6. The encoding method according to claim 4, further comprising
   setting the predetermined number of bit planes removed in the removing step, which is necessary to keep the quantity of generated codes per frame constant, based on results of the performed encoding processing, and thereafter feeding back the predetermined number to the removing step.

7. An encoder, comprising:
   a video input section for receiving picture data and separating the picture data into data components;
   a wavelet converter for receiving the data components from the video input section and dividing the data components into frequency components;
   a quantizer for quantizing the frequency components received from the wavelet converter;
   a bit plane converter for receiving the quantized frequency components supplied from the quantizer and dividing the quantized frequency components into code blocks, the bit plane converter further dividing the code blocks into a plurality of bit planes;

a rate controller for performing a rate control so that only necessary bit planes are sent to a register;

a plurality of bit model sections, each bit model section receiving a corresponding one of the necessary bit planes from the register and creating a context based on the received necessary bit plane;

a plurality of arithmetic encoders, each arithmetic encoder performing an entropy encoding and calculating generation probabilities for the context to create encoded streams; and a format generator for rearranging the encoded streams and adding additional information to the encoded streams to create data streams, the format generator outputting the data streams; wherein the rate controller performs the rate control by determining a predetermined number of bit planes to be removed, from a lower side, so that a quantity of generated codes per frame is kept constant when each of the arithmetic encoders performs the entropy encoding.

8. The encoder of claim 7, wherein the rate controller removes a predetermined quantity of bit planes among the bit planes to obtain the necessary bit planes.

9. The encoder of claim 8, wherein the predetermined quantity of bit planes is determined such that the arithmetic encoders encode substantially the same amount of generated codes.

* * * * *